United States Patent [19]

Tomac

[11] Patent Number: 4,544,022
[45] Date of Patent: Oct. 1, 1985

[54] DEVICE FOR THE THERMAL TREATMENT OF PRODUCTS, ESPECIALLY FOOD AND BEVERAGES

[76] Inventor: Zeljko Tomac, Moritzstr. 3, 6200 Wiesbaden, Fed. Rep. of Germany

[21] Appl. No.: 500,856

[22] Filed: Jun. 3, 1983

[30] Foreign Application Priority Data

Jun. 3, 1982 [DE] Fed. Rep. of Germany ... 8216051[U]
Jun. 3, 1982 [DE] Fed. Rep. of Germany ... 8216053[U]
Mar. 12, 1983 [DE] Fed. Rep. of Germany ... 8307207[U]

[51] Int. Cl.$^4$ .............................................. F24H 3/00
[52] U.S. Cl. ...................................... 165/47; 62/372; 62/457
[58] Field of Search .................. 126/263; 62/457, 371, 62/372; 220/412; 165/47

[56] References Cited

U.S. PATENT DOCUMENTS

| | | | |
|---|---|---|---|
| 415,777 | 11/1889 | Gordon | 62/457 X |
| 1,303,618 | 5/1919 | Turrettini | 126/263 |
| 4,388,813 | 6/1983 | Gardner et al. | 62/457 |

*Primary Examiner*—Stephen F. Husar
*Attorney, Agent, or Firm*—Karl F. Ross; Herbert Dubno

[57] ABSTRACT

A device for thermally treating products, especially food and beverages, is provided with a thermal element improved in its heat-exchanging efficiency, which is brought into surface contact with the goods to be treated and the selection of a thermal medium suited to establish any desired temperature of the goods and can be charged into the thermal element. For this purpose, the heat-exchanger wall of the thermal element is built in wall sections in order to form a closed unit with the goods to be treated and the thermal element is kept in mutual surface contact and the remaining wall portions form together with the heat-exchanger wall a tightly closable container for the thermal medium having at least one filling and discharge opening, provided with an openable closing element for the thermal medium. The thermal element can be built with basically rigid walls, comprising wall portions fitting the shape of the goods to be treated. However, it is also possible to build the thermal element with flexible walls, whereby it can be adjusted to the shape of each product to be treated.

16 Claims, 20 Drawing Figures

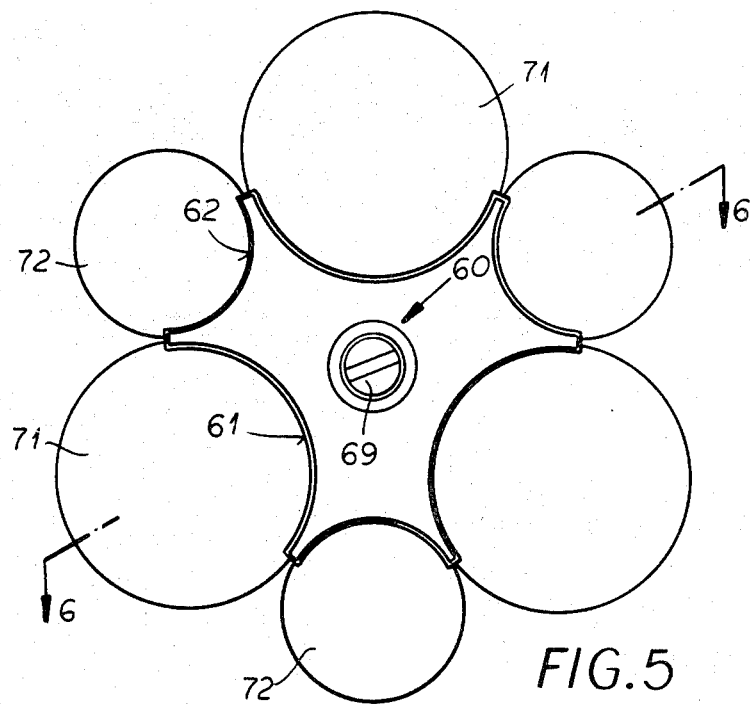
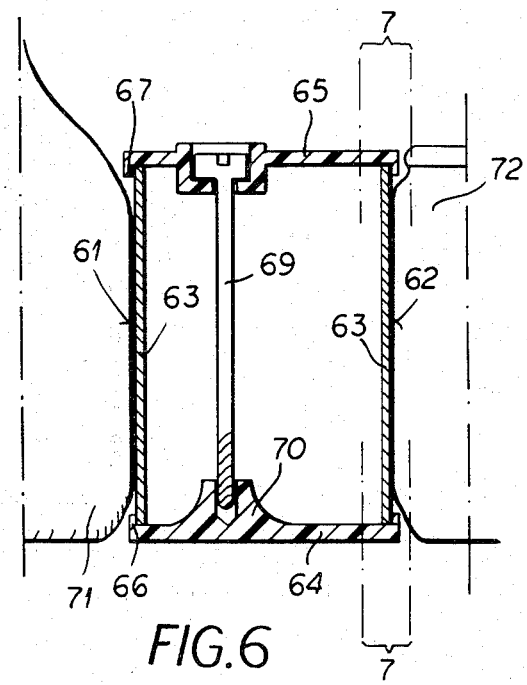 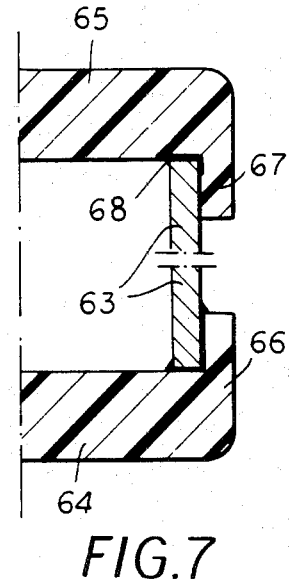
FIG.5
FIG.6
FIG.7

DEVICE FOR THE THERMAL TREATMENT OF PRODUCTS, ESPECIALLY FOOD AND BEVERAGES

FIELD OF THE INVENTION

The invention relates to a device for thermally treating products, especially food and beverages, having a heat-treatment element in the form of a holding container for a thermal medium, preferably a liquid thermal medium, whose wall can form a heat conductive wall of a heat exchanger.

BACKGROUND OF THE INVENTION

Thermal elements of this kind are known in a wide variety of shapes, for instance as pads or as containers with rigid walls. However, these known thermal elements have the essential disadvantage and drawback of lacking heat-exchanger wall areas closely accomodating the shape of the goods to be treated. Thus, with these known thermal elements it is not possible to achieve a highly efficient heat exchange between the goods to be treated and the thermal medium.

OBJECT OF THE INVENTION

The object of the invention is to provide a device for treating products whose thermal element makes possible a highly efficient heat exchange between the thermal medium and the goods to be treated and which facilitates in a very simple manner selection of the desired thermal medium for reaching the desired temperature of the goods and introduction of said medium into the thermal element.

SUMMARY OF THE INVENTION

This object is attained by constructing the heat-exchanger wall of the thermal element in wall sections to form a closed unit with the goods to be treated and the thermal element kept in mutual surface contact and the remaining wall portions form together with the heat-exchanger wall a tightly closable container for the thermal medium having at least one filling and discharge opening provided with an openable closing element for the thermal medium. In the device according to the invention the thermal element can be filled with the proper thermal medium for any desired use, for instance with a cooling mixture or with a thermal medium developing heat. Thereby the user has also the liberty to fill the thermal element with a thermal medium having high heat capacity and which under exterior influence, for instance in a freezer or by outside heating can be brought to any desired temperature.

In one embodiment of the invention the thermal element is formed as a container for the thermal medium with basically rigid walls having firm preshaped contact surfaces for the product to be treated. The contact surfaces can be suited to any requirements. For instance, such a basically rigid thermal element with heat-exchanger wall areas as concavely arched cylinder segments can tightly fit bottles or cans. In a corresponding way, in the heat-exchanger wall portions of a thermal element, receiving recesses to accommodate parallelepipedic goods, for instance freezer containers, butter bars and the like, can be provided.

In an especially advantageous development of the invention the tempering element can be combined with a carrier for transportation and keeping ready the goods to be treated, preferably cooled beverages and a receptacle for the introduction of the goods whereby the thermal element is mounted inside the receptacle and in the peripheral wall of the receptacle containing the thermal element, concavities are provided opposite to the contact surfaces of the thermal element in order to form holding compartments for the product to be treated.

In another embodiment of the invention the thermal element can also be shaped as a cuff-like flat receptacle for the thermal medium with two pliable walls kept at a small distance from each other practically over their entire surface, said walls being tightly connected to each other at their periphery and having at least one tight and safely shuttable filling and discharge opening for the thermal medium, on the outside of the cuff. In this embodiment the thermal element can embrace completely the goods or the parts to be treated and thereby completely or very closely fit the shape of the goods or the parts to be treated, which up to now was not possible with the known pad-like thermal elements.

BRIEF DESCRIPTION OF THE DRAWING

In the drawing:

FIG. 5 is a top view of a thermal element according to the invention with a configuration modified with respect to FIG. 2;

FIG. 6 is a thermal element according to FIG. 5 in section along the line 6—6 of FIG. 5;

FIG. 7 is an enlarged partial representation of the area 7 in FIG. 6;

SPECIFIC DESCRIPTION

Figures 1, 1A:
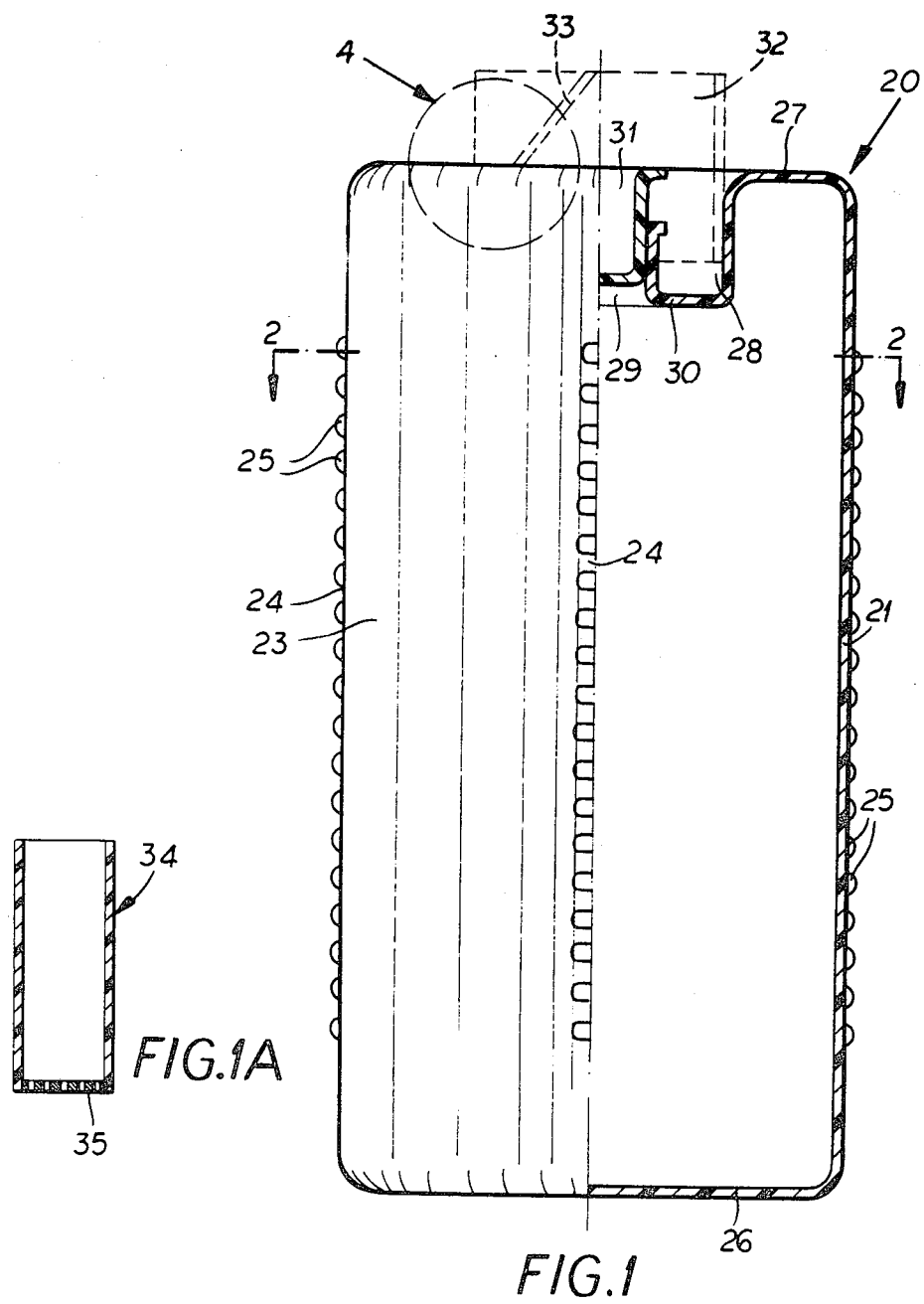
FIG. 1 is a container-like basically rigid thermal element, partially in side view, partially in axial section.
FIG. 1A is an axial sectional view through a connecting tube according to a feature of the invention.
Figure 2:
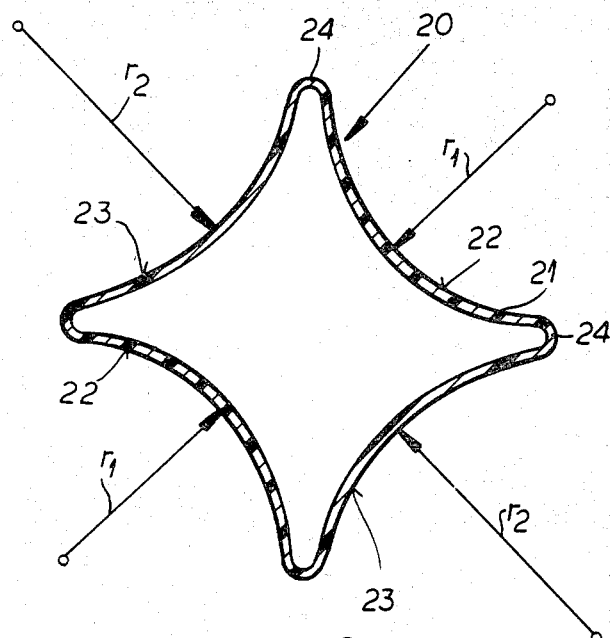
FIG. 2 is a section through the thermal element of FIG. 1 along the line 2—2 thereof.

In FIGS. 1 and 2 the thermal element 20 is shown to be shaped as a bottle-like container, whose peripheral or heat exchanger wall 21 presents four heat exchanger wall areas 22 and 23 having the shape of segments of concavely arched cylinders, whereby two heat exchanger wall areas 22 opposite to each other have a smaller curvature radius $r_1$ and the two other opposite heat exchanger wall areas 23 have a larger curvature radius $r_2$. Those curvature radii $r_1$ and $r_2$ can be for instance 35.5 mm and 45 mm to fit standard beverage bottles. Between the adjacent heat-exchange wall areas 22 and 23 in the peripheral wall of the thermal element axially extending ledges 24 are provided, which can have transversally extending gripping ribs 25 (FIG. 1).

The one end wall 26 of the thermal element 20 serving as a support can be flat or inwardly arched. The second end wall 27 has a trough-shaped recess 28 in its median area where the filling and discharge opening 29 is located. This filling and discharge opening 29 is surrounded by a socket 30, cylindrical or slightly conically diverging towards the outside, said socket receiving a firmly and safely insertable hollow stopper 31.

The thermal element according to FIGS. 1 or 2 is made of thermoplastic synthetic material, for instance polyolefins or polyester and represents an essentially rigid structure. The capacity for the thermal medium amounts preferably to 390 to 400 ml. At such a capacity from the shape of the cross section shown in FIG. 2 and the given curvature radii of the heat-exchanger wall areas 22 and 23, the exchanger element 20 corresponds more or less to the height of the beverage bottles available in commerce, which have to be fitted by the proper wall area of the thermal element. If one wishes to provide the thermal element of the kind shown in FIGS. 1 and 2 with an essentially larger capacity either by a longer axial length or by larger curvature radii of the heat-exchanger wall areas 22 and 23 providing a larger cross section of the thermal element 20, a construction of the thermal element 20 with two or more compartments to be filled with a thermal medium is recommended. A simple two-compartment construction can be for instance achieved by positioning two thermal elements according to FIGS. 1 and 2 tightly against each other with their flat end walls 26, for instance, by gluing them to each other. It is conceivable to construct such thermal elements also with two or more axially extending compartments, whereby the intermediate compartments must have lateral filling and discharge openings arranged in corresponding trough-shaped recesses. Since thermal elements made by joining two units at their end walls 26 can be very easily lined up axially, a compartment construction with more than two compartments is not recommended. In order to line up axially the thermal elements according to FIGS. 1 and 2 a connection ring 32, for example, is available to be inserted in the trough-shaped recesses 28 of the thermal elements 20 to be lined up. This connection ring 32 is an elastic synthetic-material ring fitted to the outer circumference of the trough-shaped recess 28 with its slot 33 extended over its entire length. The axial length of this connection ring should be bigger than the depth but smaller than double the depth of the trough-shaped recess 28. The connection ring 32 is inserted, after the filling and closing of the thermal elements 20 to be joined, into the trough-shaped recess 28 of the thermal element shown in dotted lines in FIG. 1. After that the second thermal element is superposed with its trough-shaped recess 28 over the connection ring 32.

Figure 3:
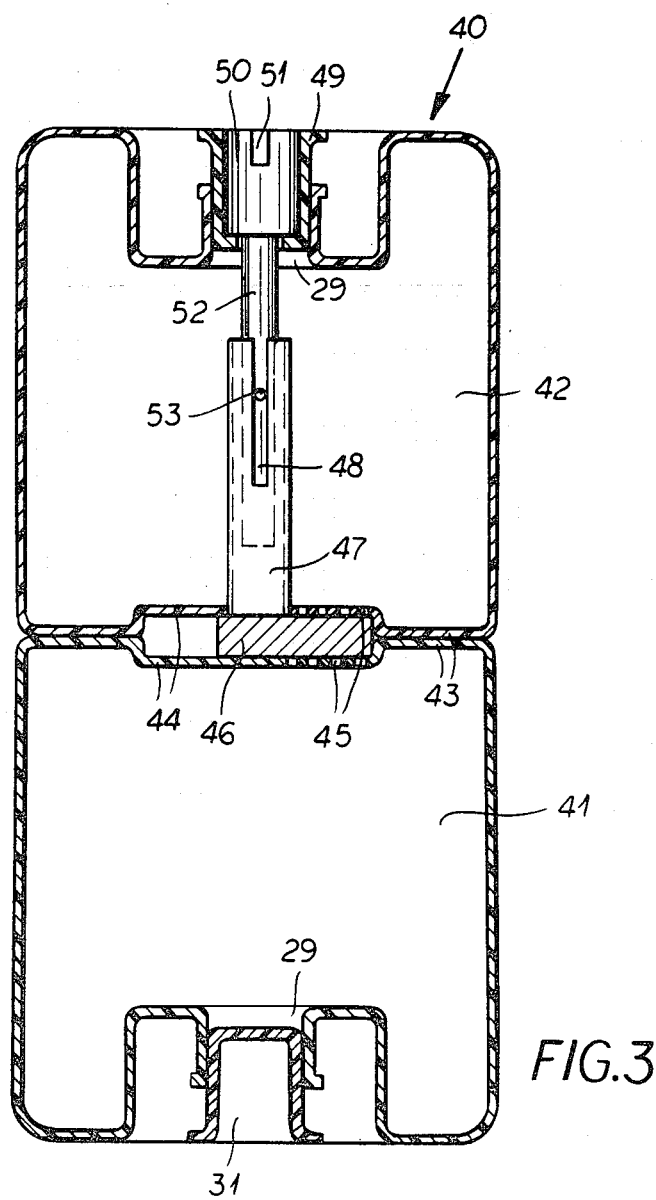
FIG. 3 is a thermal element similar to the one shown in FIG. 1, but of a two-compartment construction.

FIG. 3 shows a thermal element 40 similar to that of FIGS. 1 and 2, though in a two-compartment construction. The two-compartment construction is created by the fact that two compartment units 41 and 42 are attached to each other, for instance glued together, by their bottom walls 43. In each of the bottom walls 43 a central circular recess 44 is molded, which in one sector, for instance in one half, is built like a screen with passages 45. In the inner space created between the two recesses 44 when joining the compartment units 41 and 42 to each other, an essentially semi-circular sealing closing plate 46 is inserted which has a pipe-shaped shaft 47 at one side. This shaft extends through a corresponding passage opening in the bottom wall 43 of the compartment unit 42 (whereby in the same sense passage openings can be provided in the bottom wall 43 of the compartment unit 41). The upper portion of the pipe-shaped shaft 47 is provided with an axial slot 48.

The filling and discharge opening 29 is built in both compartment units in the same way as in the thermal elements 20, according to FIGS. 1 and 2. The compartment unit 41 is also closed with a hollow stopper 31, the same as the thermal element 20 according to FIGS. 1 and 2. But the compartment unit 42 has a closing stopper 49 in whose hollow space a rotation-actuating element 50 with coin slot 51 is mounted in a liquid-proof manner. This rotation-actuating element 50 has an actuating pin 52 with a radially protruding tang 53, said pin extending through an opening in the bottom wall of the closing stopper 49. During the insertion of the closing stopper 49 in the filling and discharge opening 29, the actuating pin 52 is introduced in the shaft 47 shaped as a pipe and is guided with the tang 43 into the axial slot 48. By turning the rotation-actuating element 50 it is possible to bring the closing plate 46 selectively in the closing position between the screen-like passages 45 as shown in FIG. 3 or in an opening position freeing the screen-like passages 45. Thereby a thermal element 40 according to FIG. 3 can be selectively activated twice with a cooling mix or a heating mix. To achieve this, the closing plate 46 is first set in a closed position and then one introduces in one compartment unit, for instance compartment 41, only the solid substances of a cooling mix or heating mix and one closes the compartment unit 41 with its stopper 31.

In the second compartment unit, for instance compartment unit 42, one charges all the components, the solid components as well as the liquid components of an identical cooling or heating mix and closes this compartment unit with its closing stopper 49. By shaking the thermal element 40 the cooling or heating mix in the compartment unit 42 is activated. When the cooling or heating mix in this second compartment unit, for instance compartment unit 42, is used up after a few hours of use and the goods in contact with the thermal element are still to be treated, the rotation-activating element 50 is turned to bring the closing plate 46 in the open position so that the liquid still capable of reaction passes from the compartment unit 42 to the compartment unit 41 holding only the solid components and creates there a newly activated cooling or heating mix. A modification of the tempering element 40 is also conceivable, whereby one of the compartment units, for instance compartment unit 42, is built essentially smaller than the compartment unit 41, namely with considerably shorter axial length. In this case it is possible to introduce in the smaller compartment unit 42 the solid component of a cooling or heating mix, while in the other compartment unit 41 the corresponding liquid is introduced. When thermal element 40 is to be used the shutter mounted in the dividing wall has only to be opened to allow the liquid and solid components to mix. This is important when liquids other than water are used or when water is not available, for instance, on car trips, in parks without water connections, and the like.

Similar possibilities exist in the case of two axially joined thermal elements in accordance with FIGS. 1 and 2, when in addition to the connection ring 32, a closing stopper capable of selectively shutting off or allowing passage by the turning of its parts, is inserted through the filling and discharge opening 29 of both thermal elements 20. It is also possible for this purpose to provide a connection and screening pipe in the filling and discharge opening 29 of both thermal elements 20 according to FIG. 1A. In this latter case, the tempering element 20 can only contain the solid components of a cooling or heating mix, which are not reacting with each other while the second thermal element is filled with the complete mixture for cooling or heating. Both thermal elements are closed by their stoppers 31. It is possible then to use only the thermal element filled with the complete mixture for cooling or heating and to connect it with the second tempering element via the connection ring 32. If after several hours of use the cooling or heating mix is used up in this one thermal element 20, it is possible to remove the stopper 31 of the second thermal element filled only with the solid components and to replace said stopper with a connection and screening tube 34 as shown in FIG. 1A. This connection and screening tube 34 has a screen bottom 35 and an axial length sufficient to engage the filling and discharge openings 29 of two axially joined thermal elements 20, outwardly sealed, and to connect the interior of both the thermal elements to each other through the screen bottom 35. If one wishes to keep two thermal elements connectable in the above manner, joined to each other, an additional connection ring 32 has to be inserted in the trough-shaped recess 28 of a newly charged thermal element 20. Then one removes carefully the plug 31 of the first thermal element 20 with the used up cooling or heating mix and inserts, instead of the plug, the connecting and screening tube 34.

After a firm axial joining and consequently a safe sealing towards the outside by means of the connecting and screening tube 34, the liquid component is transferred from the first thermal element 20 through the connecting and screening tube 34 and the screen bottom 35 into the second thermal element and the solid components contained therein. It is possible to thereafter keep the two thermal elements joined or to separate them from each other and close them with their plugs 31.

The described post-activation is of special importance wherever the liquid component for a cooling or heating mix (mostly water) is not available (for instance during car trips or in parks without water outlets).

Figure 4:
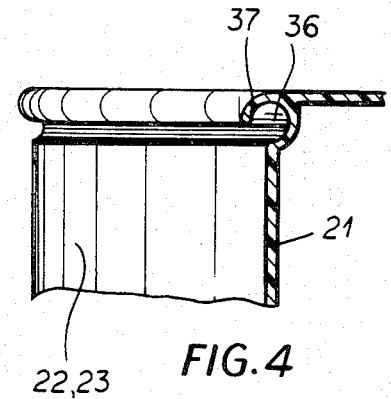
FIG. 4 is a detail of the region 4 of FIG. 1, sectioned and of modified rim construction.

In order to be able to fit in a sure manner and with good heat-conductive contact, the thermal elements 20 or 40 to cans, especially cans of beverage, it is advantageous that at least one frontal edge of heat-exchanger wall areas 22 and 23 be provided with a receiving notch or recess 36 (FIG. 4) for can rims protruding radially. Since on the other hand the rim of the common beverage can is usually recessed with respect to the circumferential area of the can, it is recommended, as shown in FIG. 4, to provide an additional retainer 37 on the receiving notch 36 which protrudes like a hooked ledge over the notch, gripping behind the flanged rim of the cans, particularly beverage cans. This way a sure hold of each can in contact with the heat-exchanger wall area is insured in addition to a sure and quick positioning of the can circumference to each of the heat-exchanger wall areas 22 and 23. On the other hand, the retainer 37 protruding over the surface of each of the heat-exchanger wall areas will not get in the way when a bottle is fitted to any of the heat-exchanger wall areas, since the retainer 37 is arranged either underneath the bottom of the bottle or in the area of the bottle neck.

Besides the shape of the cross section shown in FIG. 2 for thermal elements 20, according to FIG. 1, and thermal elements 40 according to FIG. 3, a wide variety of cross sections and their adaptation to different types of use is conceivable. In this context, different examples are shown in FIGS. 5 to 12.

FIGS. 5 to 7 show a thermal element 60 having at its periphery six heat-exchanger wall areas 61 and 62, shaped as segments of a cylinder in an alternating sequence. Thereby the cylindrical segments of the heat-exchanger wall area 61 have a smaller curvature radius, for instance 35.5 mm, and the heat-exchanger wall areas 62 a larger one, for instance 45 mm. In this manner six bottles 71 or six cans 72 with different diameters can be optimally fitted in drinking order to the thermal element 60.

The peripheral wall 63 of this thermal element 60 consists of metal, for instance aluminum, while the end areas consist of a bottom 64 and a lid 65 made of synthetic material. The bottom 64 has a small circumferential flange 66 gripping over the lower rim of the circumferential wall 63 and is glued to this. The lid 65 has also a small circumferential flange 67, gripping over the upper rim of the circumferential wall 63. Inside the circumferential flange 67 a sealing material is applied at 68 to the inside of the lid 65. The lid is held by a bolt 69 mounted in its median area, penetrating through the lid wall and is screwed in a boss 70 molded at the inside of the bottom 64. The filling and discharging of the thermal medium is carried out while the lid is removed. As shown in the drawing the circumferential flanges 66 and 67 are in the range of smaller bottles and can diameters.

In all the embodiments the thermal elements 20, 40 and 60 are suitable for holding cooling or heating mixes to be activated. A cooling mix to be activated can be, for instance, a mixture of 150 parts by weight of granular calcium ammonium nitrate with 100 parts by weight granulated urea and approximately 120–140 parts by weight of water. It is also known to make heating mixtures in a similar way from solid matter and liquid, especially water and to use them in connection with thermal elements of this kind. The thermal element can also be operated as a cold or heat accumulator, insofar as its thermal medium or any other filling, for instance water, can be heated or cooled to the desired temperature.

Figure 8:
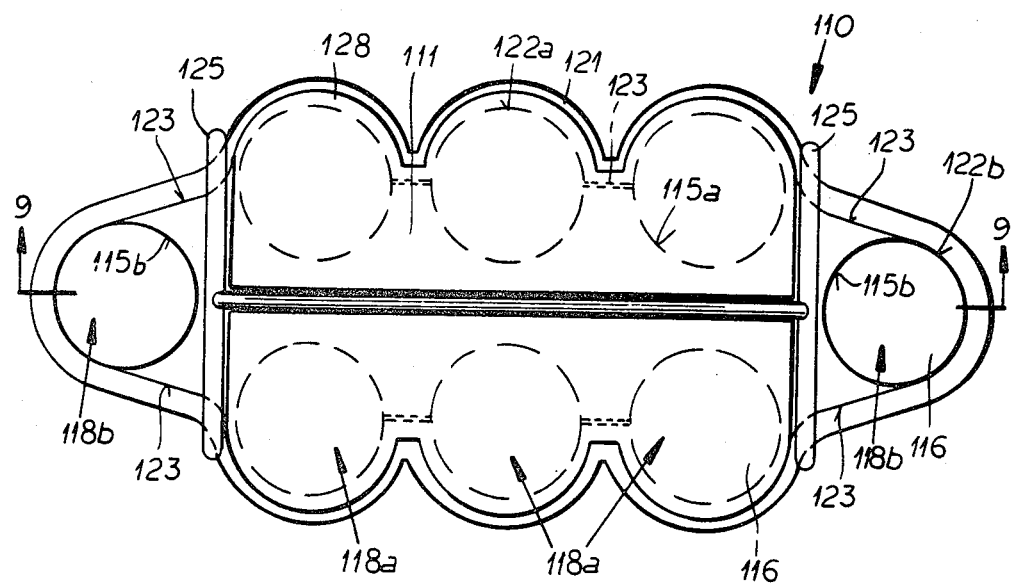
FIG. 8 is a device according to the invention having the thermal element combined with a fixture for carrying the goods shown in a top view.
Figure 9:
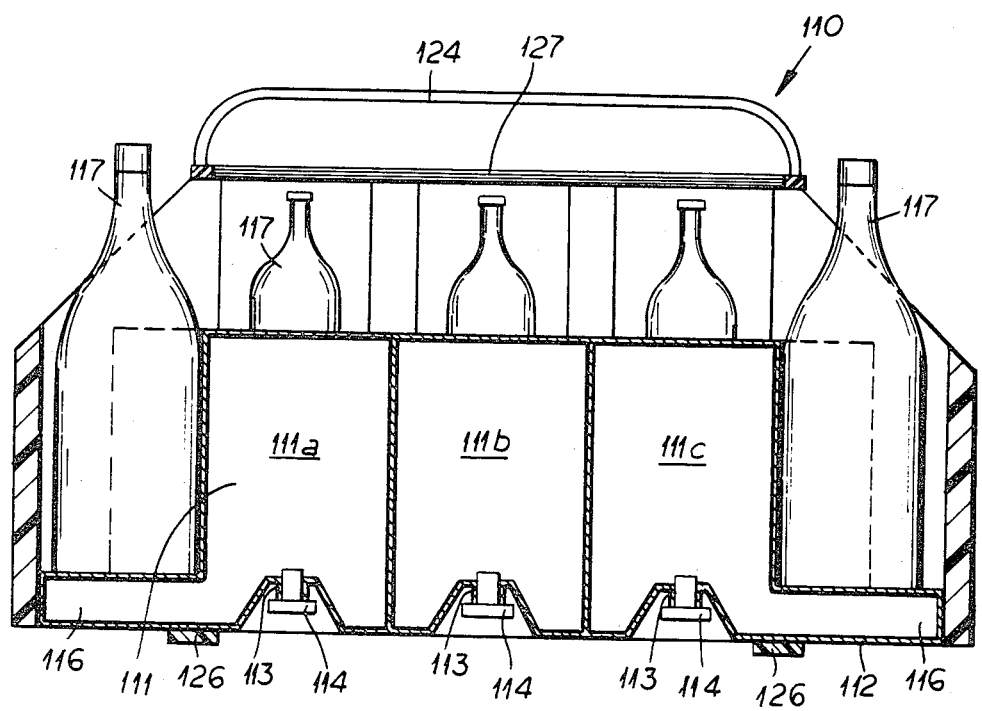
FIG. 9 is a device as in FIG. 8 in vertical section corresponding to line 14—14 of FIG. 13.
Figure 10:
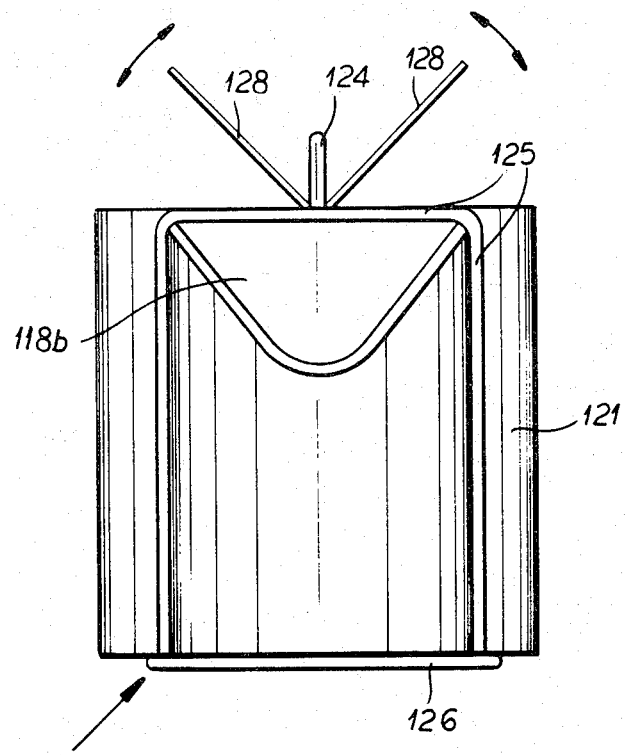
FIG. 10 shows the device according to FIGS. 8 and 9 in frontal view.

In the example of FIGS. 8 to 10 a device for transporting and keeping ready beverages cooled or not, as desired, is shown in the form of a bottle carrier 110. This bottle carrier 110 comprises a thermal element 111, whose interior is divided into three compartments 111a, 111b, 111c. In the bottom wall 112 of this tempering element 111 countersunk filling and discharge openings 113 are situated, each leading to one of these compartments 111a, 111b, 111c and closable with a firmly insertable closing element 114. The thermal element presents on its peripheral wall six lateral and arched contact surfaces 115a (three on each side) and two end contact surfaces 115b. Under each of these concavely arched contact surfaces 115a and 115b in the bottom area of the thermal element 111 an approximately circular and hollow projection 116 is provided, on which the bottles 117 fitted to the contact surfaces 115a respectively 115b are positioned. These hollow projections 116 are, as shown in FIG. 9, in communication with the interior of the thermal element 111 and also with the thermal compartment 111a, 111b and 111c, so that these projections 116 can also be filled with the thermal medium.

The thermal element 111 is surrounded by a receptacle 121 which can consist of a peripheral wall made of synthetic material, for instance plastic foam. In this peripheral wall concavities 122a, and 122b are provided opposite to the concavely arched contact surfaces 115a and 115b, which together with the contact surfaces 115a and 115b form receiving compartments 118a and 118b for beverage bottles or cans. The peripheral wall creating the receptacle 121 is glued to the thermal element 111 in the lateral upwardly extending areas 123 and at the circumference of the projections 116, so that the entire bottle carrier 110 is a rigid unit. For more comfortable handling, a handle 124 is provided, said handle being attached to the receptacle 121 by means of two frames 125 and mounting ledges 126 extending transversely under the bottom wall 112. Between the two frame sections 125 a hinged strip 127 is articulated to the two lids 128 swingable over the lateral receiving compartments 118a. These lids can also be made of transparent synthetic material. It is also possible to provide on each side three separate lids and also an individual lid for each receiving compartment 118a.

Figure 11:
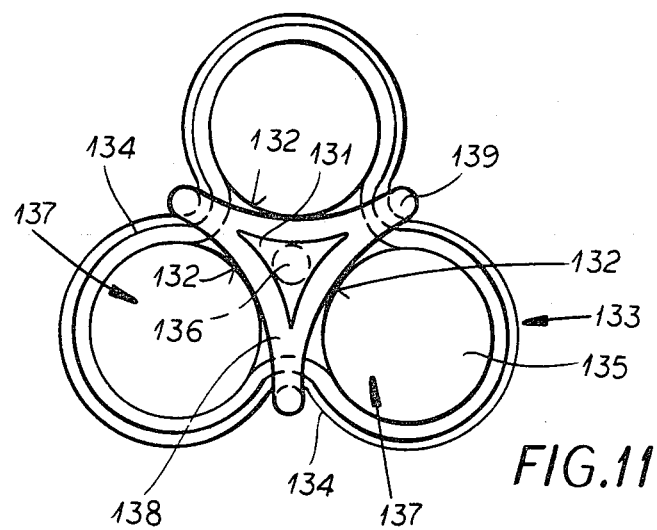
FIG. 11 is a simplified device with fixtures for carrying and receiving the goods in top view.

In the example shown in FIG. 11 a thermal element 131 is presented which has three concavely arched contact surfaces 132 at its periphery, a filling and discharge opening shown in dotted lines, safely closable with a corresponding closing element. The thermal element 131 is firmly inserted in a receptacle 133 made of a peripheral wall 134 and a bottom wall 135, for instance by gluing, whereby the bottom wall 135 leaves room in its central portion for the filling and discharge opening 136. In the peripheral wall 134 concavities are provided opposite to the concavely arched contact surfaces 132, so that receiving compartments 137 for the goods to be treated, for instance bottles or cans result. Also in this example a handle 138 can be provided which can be attached to the receptacle 133 over the frame sections 139 engaging the peripheral wall 134.

Figure 12:
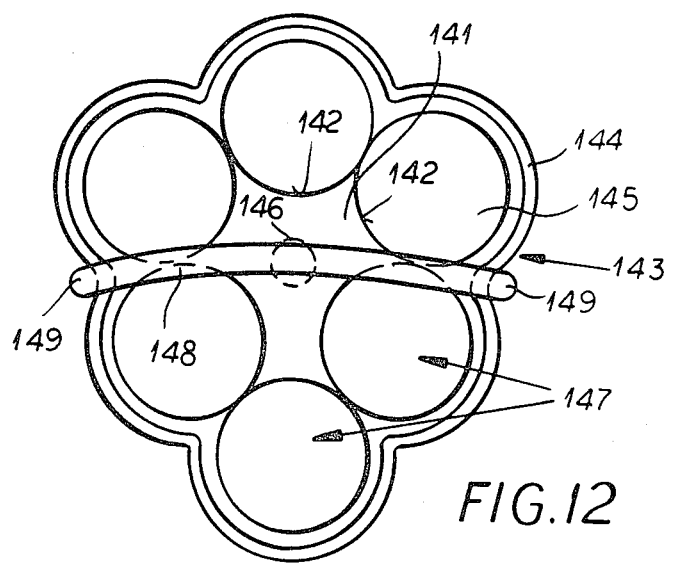
FIG. 12 is a further simplified device according to the invention with fixtures for carrying and receiving the goods to be treated shown in a top view.

In the example shown in FIG. 12, the feature is a thermal element 141 with its concavely arched contact surfaces 142. Also, in this example the receptacle 143 is made of a peripheral wall 144 and a bottom wall 145, whereby the bottom wall 145 leaves room in its central portion for the filling and discharge opening 146 for the cooling medium, arranged underneath the thermal element 146, and for the inserted closing piece. As in the example shown in FIG. 11 the peripheral wall 144 of the receptacle is provided with arched concavities opposite to the concave contact surfaces 142 of the thermal element 141, so that the receiving compartment 147 results. Over the entire upper side of the receptacle 143 and of the cooling element 141 runs a handle 148 which is attached to the peripheral wall 144 of the receptacle by means of frame sections 149.

Figure 13:
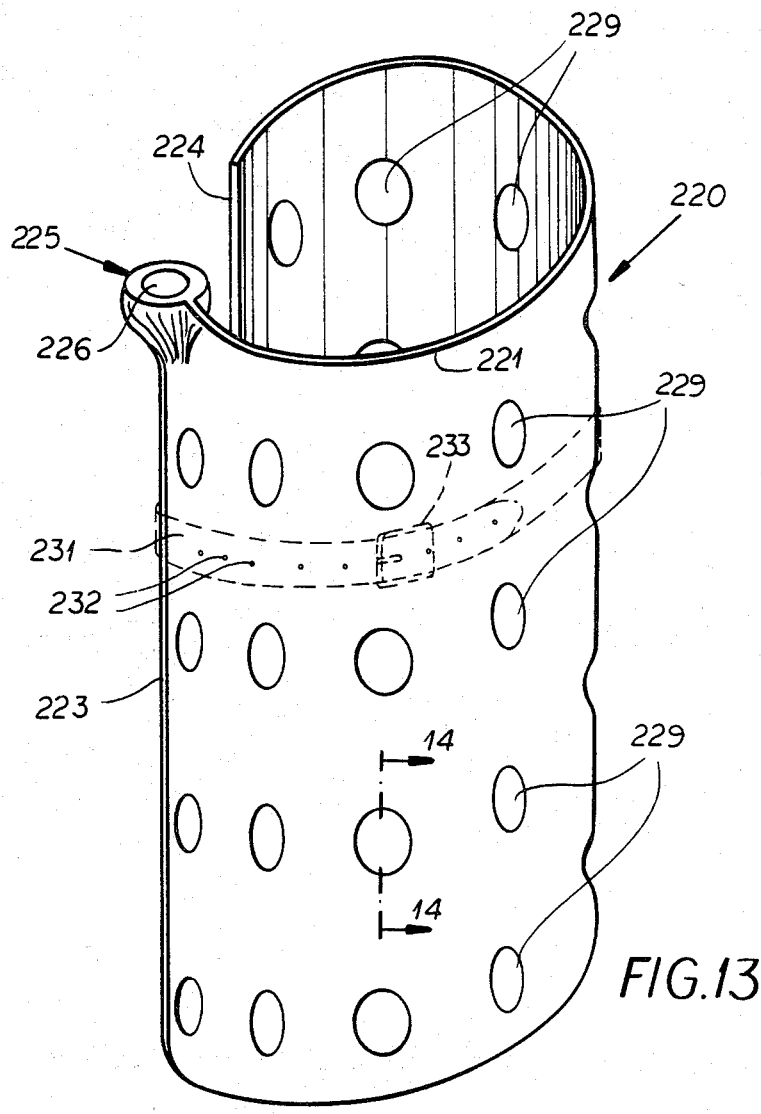
FIG. 13 is a cuff-like thermal element in a first embodiment, shown in perspective.
Figure 14:
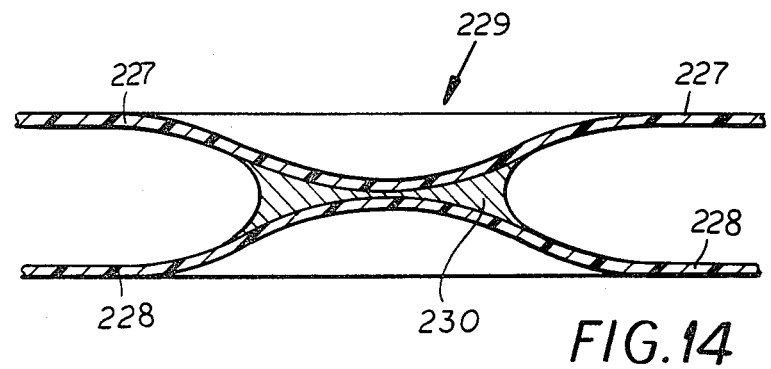
FIG. 14 is a partial section along line 14—14 of FIG. 13.

The example according to FIGS. 13 and 14 shows a thermal element shaped as a flat cuff-like container 220 which is provided with a filling and discharge opening 225 for the thermal medium at one of the edges, namely where the peripheral rim 221 meets the axial rim 223. Due to this arrangement the filling and discharge opening 225 is always on the outside of the cuff. The filling and discharge opening 225 is closable with a stopper. As evident from FIGS. 13 and 14, the container 220 in this embodiment is made of two foil-like flexible walls 227 and 228 which are connected tightly to each other, for instance sealed together along the peripheral rims 221 and 222 and the axial rims 223 and 224.

In order to prevent the cuff-like container 220 from inflating in a cushion-like manner during the filling with the thermal medium and thereby losing its pliability, in the crater-shaped areas 229 both container walls 227 and 228 are connected to each other and kept at a preset distance from each other. As shown in FIG. 13, these crater-shaped areas 229 are distributed over the entire wall area of the container 220. In the example given in FIGS. 13 and 14, in these crater-shaped areas 229 a plate-shaped element 230 made of soft material is inserted as an intermediate element and buffer between the container walls 227 and 228 and is biconcavely shaped in the area 229 while sealed together with container walls 227 and 228.

As shown in FIG. 13, in order to keep the very mobile and flexible foil-like walls 227 and 228 of the container around the goods to be treated, the part or parts of the body which it surrounds, it can be provided with a belt-like closing element 231, which in this particular example has holes 232 and a buckle 233 with a prong. If desired, or required, two or more belt-like closing elements 231 can be provided.

Figure 16:
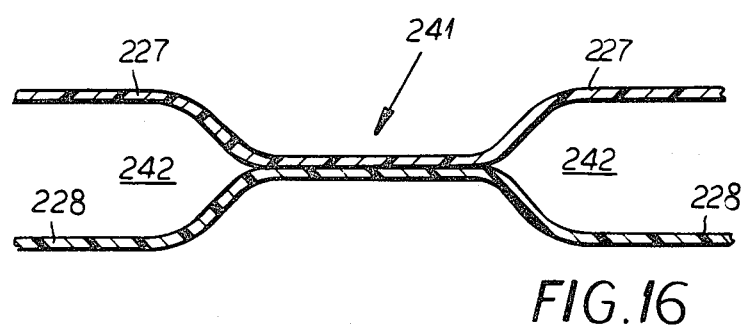
FIG. 16 is a partial section corresponding to line 16—16 of FIG. 15.
Figure 15:
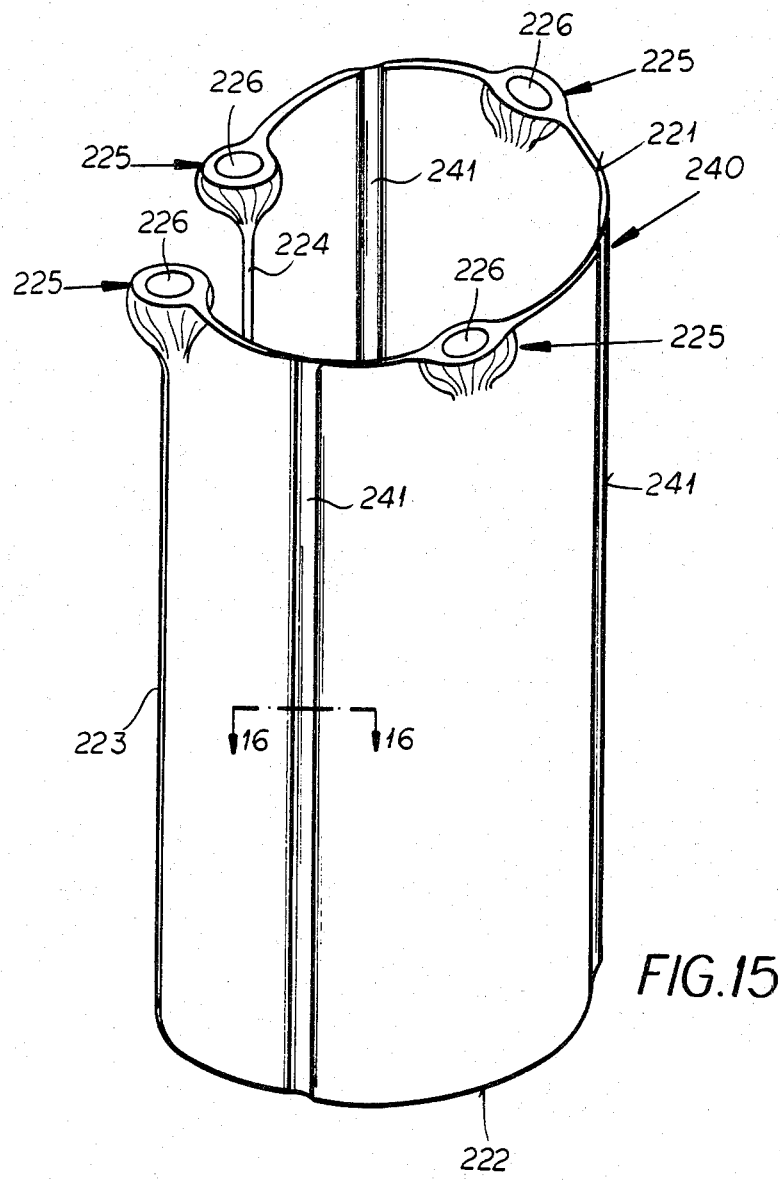
FIG. 15 is a second embodiment of the cuff-like thermal element in a perspective representation.

In the example of FIGS. 15 and 16, the thermal element is also a very mobile and flat container 240 made of foil-like flexible walls 227 and 228, said container being tightly closed all around at its peripheral rims 221 and 222 and its axial rims 223 and 224, for instance by sealing together the walls 227 and 228. Any inflation of the flat cuff-like container 240 during the charging of the thermal medium is avoided by molding in the container walls 227 and 228 a number of ribs 241 at intervals from each other and basically parallel to the axial rims 223 and 224. The container walls 227 and 228 are sealed firmly and tightly together with their inner surfaces at these ribs 241. Thereby, the container 240 is subdivided into a number of compartments 242, extending axially. Each of these compartments is provided with its own filling and discharge opening 225. These filling and discharge openings 225 are closable with a plug 226 as shown in the example of FIGS. 13 and 14. As in the example of FIGS. 13 and 14, when desired or required, the container 240 can be provided with a belt-like closing element 231 (as in FIG. 13).

Figure 17:
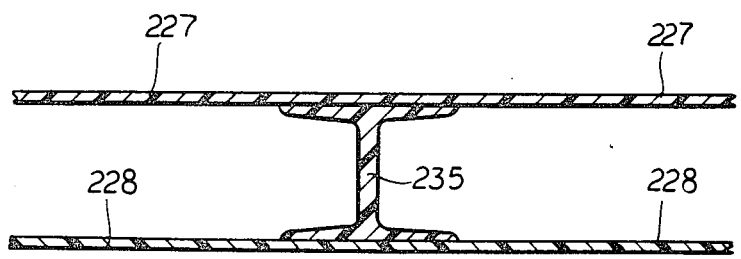
FIG. 17 is a further embodiment of the wall spacers in the case of cuff-like thermal elements in a representation corresponding to FIG. 19.

When it is desired to build the container 240 with a completely smooth wall on one side, the ribs 241 can be molded only in one of the container walls, for instance in the wall 227, with a corresponding double depth. The container wall 228 remains in this way practically smooth on its entire surface. In this case it is also possible to arrange and make the filling and discharge openings 225 only in the container wall 227, without disturbing the smooth configuration of the container wall 228, even in the area of the peripheral rim 221. If it is desired to keep both container walls as smooth as possible, it is possible to insert inside the container 220, according to FIG. 13, in the wall areas 229, instead of a biconcavely shaped spacer and buffer element 230, a double-headed spacer and buffer elements 235 sealed at the opposite head surfaces to the interior surfaces of the foil-like container walls 227 and 228, as shown in FIG. 17. In the case of a container 240 with axially extending compartments 242 as shown in FIG. 15, it is possible to replace the lamellar molded areas in the container walls 227 and 228 with soft double T-profile elements, flexible especially in their web portions, inserted inside the container 240 and sealed to the inner surfaces of the walls 227 and 228 with their opposite outer surfaces.

The container walls 227 and 228 can be made of synthetic material, rubber or metal foil. Particularly suitable are polyolefin based synthetic materials. When making the container 227 and 228 of metal, particularly aluminum, such metal foil should be coated on both surfaces with a synthetic-material layer, for instance a polyolefin layer.

Figure 18:
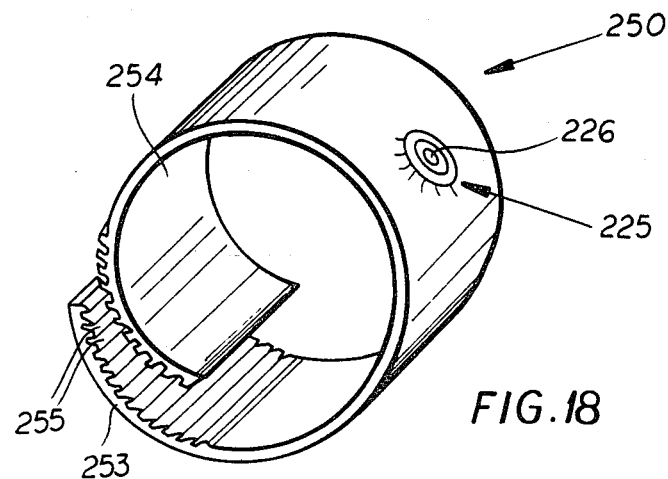
FIG. 18 is a third embodiment of the cuff-like thermal element in perspective representation.

In the example given in FIG. 18, the thermal element is a flat, cuff-like container 250 whose container walls are preformed of synthetic material and are connected tightly all around at their rims, for instance hot sealed. The container walls in this example are no longer flexible like a foil, but have their own rigidity which still allows for the pliability corresponding to the desired mobility of the thermal element. Due to this rigidity of the container walls, it is possible in this example to eliminate the spacers provided inside the containers 220 and 240.

In the example shown in FIG. 18, the filling and discharge opening 225 is provided on the outside of the peripheral surface of the container 250 in the container wall. The filling and discharge opening 225 is closable with a stopper 226, as in the other embodiments.

In order to hold together the ends of the container 250 wrapped around the goods or body parts to be treated, in this example the container ends are formed as cuff-segments 253 and 254 overlapping each other in circumferential direction. In the inner wall, axial toothed ribs 255 are molded in the area of the outer cuff segment 253. In a corresponding manner, in the outer wall of the container 250, axial toothed ribs 255 are molded in the cuff segment 254 which comes to lie underneath. By superposing the overlapping cuff segments 253 and 254 the toothed ribs 255 engage each other, whereby the width of the overlapping cuff segments 253 and 254 is adjustable as desired. Since the toothed ribs 255 have a saw-tooth profile in the shown example, they are pulled towards each other by forces acting in the direction in which the cuff opens. For this reason it is recommended to preform the container walls so as to give them a tendency to widen or open the cuff shape of the container 250.

Figure 19:
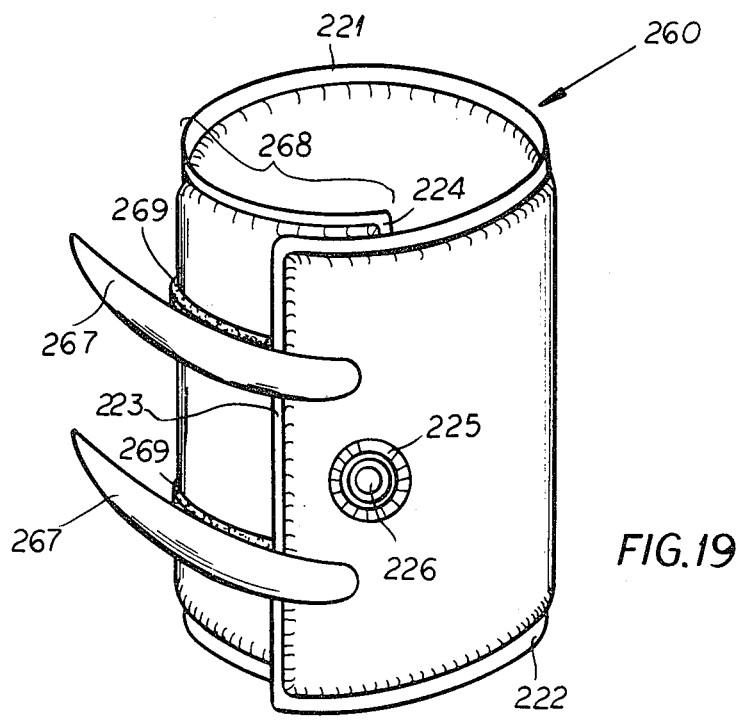
FIG. 19 is a fourth embodiment of the cuff-like thermal element in perspective representation.

In the example shown in FIG. 19, a cuff-like flat and particularly mobile container is provided, whose flexible container walls 227 and 228 are made of a textile fabric inserted in rubber or synthetic material. The container walls 227 and 228 are tightly closed all around by being hot sealed to each other at their circumferential rims 221, 222, 223, 224 as shown in FIG. 19. In order to prevent the inflation of the flexible container walls in the container 260, when charging the thermal medium, spacer and buffer elements are provided inside the container 260, preferably of a double-mushroom shape corresponding to FIG. 17.

Unlike the embodiment according to FIGS. 1 and 2, the container 260 has a filling and discharge opening 225 on its outer circumferential surface in the outer wall. In the example according to FIG. 19 the particularly mobile cuff-like container 260 has a special device for holding together the cuff ends. For this purpose at one end of the cuff, straps of hook and loop fastener tape 267 extending outwardly over the axial edge 223 in circumferential direction are mounted. On the other cuff-end area 268, a corresponding fastening tape 269 is provided with which the strap with the fastening tape engages. FIG. 19 shows this fastening tape arranged like two strips. It is also possible to provide the entire end area of the cuff 268 with such a fastening tape 269.

In the shown example a stopper 226 is provided as a closing element. Other safe closing elements can be provided instead, such as snap caps, screw caps, and bayonet-type caps.

It is preferable to charge the thermal element built like a cuff-shaped flat, more or less flexible body with a thermal medium which is liquid or liquefiable or at least having a good flowability. Particularly, cooling mixes or heating mixes made of granulated solid material and liquids come into consideration. For instance, a cooling mix of granulated calcium ammonium nitrate, granulated urea and water can be considered. For the simple, safe proportioning of such cooling and heating mixes and in order to facilitate thereby the establishment of desired temperatures of the treatment, it has been proven that it is especially advantageous to make the thermal element in each of the described embodiments with a charging capacity of approximately 390 ml to 400 ml.

What is claimed is:

1. A device for the thermal treatment of products, especially food and beverages, comprising a container for holding a thermal medium, said container defining a thermal element having walls which are at least partially formed as heat conductive walls, said heat conductive walls being formed in sections having a shape complementry to the product to be treated for maximum heat exchange when one of said sections and said product are brought into mutual surface contact, said container being formed with at least one filling and discharge opening provided with an opening and closing element for said thermal medium, the sections of said thermal element being rigid, with at least one section being formed as a concave segment of a cylinder, said concave segment having a frontal edge thereof formed with a recess for receiving radially extending can rims.

2. A device for the thermal treatment of products, especially food and beverages, comprising a container for holding a thermal medium, said container defining a thermal element having walls which are at least partially formed as heat conductive walls, said heat conductive walls being formed in sections having a shape complementry to the product to be treated for maximum heat exchange when one of said sections and said product are brought into mutual surface contact, the sections of said thermal element being rigid, with at least one section being formed as a concave segment of a cylinder, said concave segment having a frontal edge thereof formed with a recess for receiving radially extending can rims, the interior of said container being divided into at least two compartments separated by a dividing wall, said dividing wall being formed with a passageway communicating between said compartments, said passageway being provided with a shutter actuatable from outside of said container for opening and closing said passageway, each of said compartments being formed with at least one filling and discharge opening provided with an opening and closing element for said thermal medium.

3. A device for the thermal treatment of products, especially food and beverages, comprising a container for holding a thermal medium, said container defining a thermal element having walls which are at least partially formed as heat conductive walls, said heat conductive walls being formed in sections having a shape complementry to the product to be treated for maximum heat exchange when one of said sections and said product are brought into mutual surface contact, said container being formed with at least one filling and discharge opening provided with an opening and closing element for said thermal medium, the sections of said thermal element being rigid, with at least one section being formed as a concave segment of a cylinder, said concave segment having a frontal edge thereof formed with a recess for receiving a rim of a can.

4. The device defined in claim 3 wherein said recess is formed by a retainer protruding from said frontal edge for gripping behind an axially extending can rim.

5. The device defined in claim 4 wherein all of said sections are formed as concave segments of a cylinder with the frontal edges thereof being formed with said retainers protruding therefrom.

6. The device defined in claim 3 wherein at least one of said sections is formed with a substantially flat bottom with the concave segment thereof disposed perpendicular to said bottom.

7. The device defined in claim 3 wherein said filling and discharge opening is surrounded by an annular recess adapted to receive a connecting ring whereby said container can be joined to another container.

8. The device defined in claim 3 wherein said container is provided with a carrier for the transportation thereof, said carrier being formed with concavities juxtaposed with respective sections of said heat conductive walls forming therewith respective holding compartments for said products, said concavities having substantially the same radius of curvature as the respective sections.

9. The device defined in claim 8 wherein said container and said carrier are provided with bottom portions for closing the lower ends of the respective holding compartments.

10. The device defined in claim 9 wherein said bottom portions are formed by projections of said thermal element for holding said thermal medium.

11. The device defined in claim 8 wherein the upper ends of said holding compartments are closable by at least one lid pivotally mounted on said carrier.

12. The device defined in claim 3 wherein the interior of said container is divided into at least two compartments, each of said compartments being formed with at least one of said filling and discharge openings.

13. The device defined in claim 12 wherein said compartments are separated by a dividing wall formed with a passageway communicating between said compartments, said passageway being provided with a shutter actuatable from outside of said container for opening and closing said passageway.

14. The device defined in claim 3 wherein said filling and discharge opening is formed in an end of said container remote from the heat conductive walls thereof.

15. The device defined in claim 3 wherein said opening and closing element is threadedly engaged to said container in the closed position thereof.

16. The device defined in claim 3 wherein said opening and closing element is a tube provided with a screen and insertable into the filling and discharge openings of opposed containers whereby the respective interiors of said containers are in communication through said tube.

* * * * *